United States Patent [19]
Vriens

[11] Patent Number: 5,841,247
[45] Date of Patent: Nov. 24, 1998

[54] CATHODE RAY TUBE, DISPLAY SYSTEM INCORPORATING SAME AND COMPUTER INCLUDING CONTROL MEANS FOR DISPLAY SYSTEM

[75] Inventor: Leendert Vriens, Eindhoven, Netherlands

[73] Assignee: U.S. Philips Corporation, New York, N.Y.

[21] Appl. No.: 749,444

[22] Filed: Nov. 15, 1996

[30]     Foreign Application Priority Data

Nov. 24, 1995   [EP]   European Pat. Off. ................ 9520327

[51] Int. Cl.$^6$ .................................................. H01J 29/56
[52] U.S. Cl. .......................................... 315/370; 313/403
[58] Field of Search ........................... 315/370; 348/806; 313/403, 408, 402

[56]           References Cited

U.S. PATENT DOCUMENTS

| | | | |
|---|---|---|---|
| 4,475,056 | 10/1984 | Hirai | 313/403 |
| 4,638,212 | 1/1987 | Nakamura | 313/408 |
| 4,751,425 | 6/1988 | Barten | 313/403 |
| 5,030,881 | 7/1991 | Marks et al. | 313/403 |
| 5,055,736 | 10/1991 | Yun et al. | 313/402 |
| 5,378,959 | 1/1995 | Mancini | 313/402 |
| 5,534,746 | 7/1996 | Marks et al. | 313/408 |
| 5,619,094 | 4/1997 | Vriens | 313/402 |

*Primary Examiner*—Theodore M. Blum
*Attorney, Agent, or Firm*—John C. Fox

[57]           ABSTRACT

A display system which comprises a means for changing the $s/a_v$ and/or $p/a_h$ ratio, the scanning-line pitch s and/or the pixel pitch p of incoming signals.

10 Claims, 3 Drawing Sheets

CATHODE RAY TUBE, DISPLAY SYSTEM INCORPORATING SAME AND COMPUTER INCLUDING CONTROL MEANS FOR DISPLAY SYSTEM

BACKGROUND OF THE INVENTION

A first aspect of the invention relates to a display system comprising a cathode ray tube which is provided with a shadow mask having a large number of apertures, which apertures are arranged in columns, a means for generating electron beams and a means for deflecting said electron beams across the shadow mask, and a means for controlling the deflection of the electron beams across the shadow mask in dependence upon incoming signals.

Such display systems are well-known. Efforts are being made to render such display systems suitable for multimedia applications. The expression "multimedia application" means inter alia that the relevant system should be suitable for displaying television images as well as for use in a computer system, preferably without a noticeable change in picture quality. The incoming signals can be television signals or signals generated by a computer. It has however been found that in existing systems Moiré effects occur, which limit the use of the relevant display systems for multimedia applications.

OBJECTS AND SUMMARY OF THE INVENTION

It is an object of the invention to reduce the limitations on the use of display systems for multimedia applications.

To this end, a display system in accordance with the invention is characterized in that the display system comprises comparison means to compare the distances s,p between respectively, scanning lines and/or between pixels of the incoming signals with the distance $a_v$ between apertures in a column and/or the distance $a_h$ between columns, and modification means to change, in dependence upon the ratios $s/a_v$ and/or $p/a_h$, the deflection of the electron beams.

The invention is based on the insight that, in order to be suitable for multimedia applications, a display system must be suitable for displaying a large number of different incoming signals without the occurrence of disturbing Moiré effects. The intensity of the Moiré effects is a function of the ratio between the scanning-line distance s and the distance between apertures in a column $a_v$ (=$s/a_v$), and further of the ratio between the distance between displayed pixels p (if the image is displayed in pixels) and the distance between columns of apertures $a_h$, as will be explained herein below. The number of lines displayed on the display screen and hence the distance s between the field lines varies substantially both for television signals and for signals generated by computers. Signals generated by computers, but also for example teletext signals, further exhibit a great variation in the number of pixels displayed per field line and hence in the distance p between the pixels.

Consequently, in operation, a display system which is used for multimedia applications will receive and display many different signals, which each have a specific s and/or p value. However, the shadow mask and hence the values of $a_v$ and $a_h$ are constants. As a result, a great variation in the values of $s/a_v$ and/or $p/a_h$ can occur, so that it is difficult to preclude disturbing Moiré effects in the existing systems.

The display system in accordance with the invention comprises a means for deflecting the electron beams and hence, more particularly, for changing the distance between the scanning lines s and between the pixels p in dependence upon the given ratios $s/a_v$ and/or $p/a_h$.

The display system preferably comprises a means for changing the scanning format of the image displayed.

This is a simple way of changing s and/or p.

Preferably, the modification means are set so that, after said change, the values for $s/a_v$ and/or for $p/a_h$ are within one of the following ranges:

2.8/8–3.2/8
5.4/8–5.8/8
6.3/8–7/8
9/8–11.5/8
12.5/8–15/8
17/8–20/8

In these ranges, few Moiré effects occur. Preferably, both $s/a_v$ and $p/a_h$ are one of said ranges.

The above aspect of the invention relates to a display system. The invention also relates to a computer comprising means for sending a signal to a display system comprising a cathode ray tube.

Computers and monitors for computers are often sold separately. Thus, it is not known beforehand which monitor will be used at a future time for a specific computer.

A computer in accordance with the invention is characterized in that said computer comprises means for receiving data about the construction of the shadow mask in the cathode ray tube, as well as comparison means for comparing the signals to be sent with the data received, and modification means for changing the signal to be sent, in dependence upon a comparison between the data of the shadow mask and the signal to be sent.

This second aspect of the invention can be regarded as the mirror image of the first aspect.

Moiré effects can be very disturbing. In general, the user of a computer which is coupled to a display system does not know what causes these disturbing effects. In the case of well-known computers, there is a fair chance that a user of a computer, who replaces a small (15") monitor having a low resolution by a larger, more expensive monitor having a higher resolution, which did not exhibit disturbing Moiré effects in the shop, will find that, after installing said monitor at home, the image displayed exhibits very disturbing Moiré effects. A logical conclusion which could be drawn by the user of the computer is that the disturbing Moiré effects are caused by the computer. A computer in accordance with the invention has the advantage that if either precludes such a situation or reduces the risk of such a situation occurring. This object is achieved by comparing data of the shadow mask with data of the signal to be sent and, in dependence upon this comparison, changing the signal to be sent.

A third aspect of the invention relates to a cathode ray tube having a diagonal of the display screen which is larger than or equal to 17" and comprising a shadow mask. Such cathode ray tubes can exhibit very disturbing Moiré effects, in particular for high-resolution images.

In order to preclude and/or reduce such Moiré effects, a cathode ray tube in accordance with the third aspect of the invention is characterized in that the distance between apertures in the horizontal direction $a_h$ is less than 0.4 mm.

As a result, the $p/a_h$ ratio for high-resolution images is increased (for a 21" cathode ray tube from 4.2/8 to 5.1/8 or more). At first sight, it seems contradictory to choose a relatively small distance of $a_h$ for the relatively large cathode ray tubes. However, as will be explained herein below, in this manner it is precluded that the $p/a_h$ value comes close to 4/8. This value of $p/a_h$ yields strong Moiré effects which are relatively difficult to preclude.

A fourth aspect of the invention relates to a cathode ray tube comprising a shadow mask having a large number of apertures which are arranged in columns. In accordance with this aspect, the ratio $a_v/a_h$ lies within one of the following ranges: 0.45–0.55; 0.9–1.1; 1.8–2.2. The value of $a_h$ may vary over the surface of the shadow mask.

These and other aspects of the invention will be apparent from and elucidated with reference to the embodiments described hereinafter.

DESCRIPTION OF THE PREFERRED EMBODIMENTS

Figure 1:
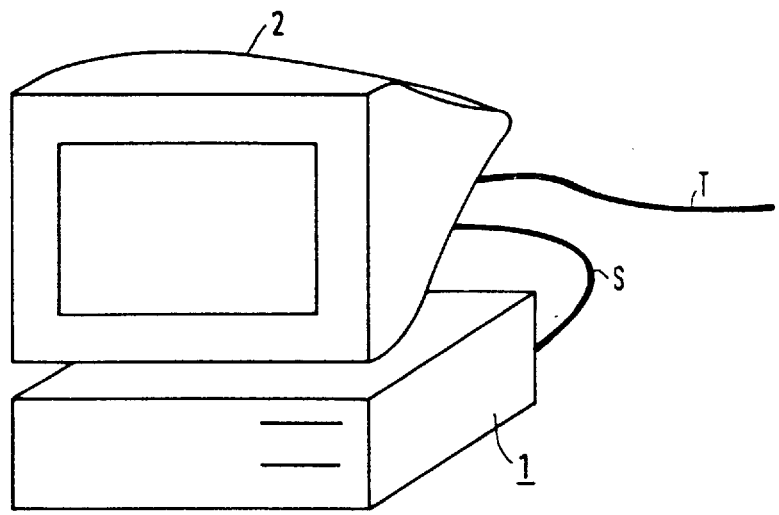
FIG. 1 shows a combination of a computer and a display system.

FIG. 1 shows a computer 1 and a display system 2. In operation, computer 1 generates picture signals S which are supplied to the display system 2. The display system 2 can further receive television signals T, for example, via a cable. The number of field lines displayed on the display screen of the display system is governed by the signal sent to the display system. In the case of a television signal T, the number of field lines is, for example, approximately 537 for a PAL/Secam signal, 452 for an NTSC signal, 967 for an MUSE signal, taking into account, as usual, approximately 7% overscan. In the case of a PAL/Secam and NTSC HDTV signal, approximately twice as many field lines are displayed. Computers generate signals for which the number of lines of the current systems can be, for example, 480 (for a so-called VGA signal), 600 (SVGA), 768 (XGA), 1024 and 1200, taking 5 to 10% underscan into account. Consequently, the number of lines displayed on the display screen varies substantially.

Figure 2:
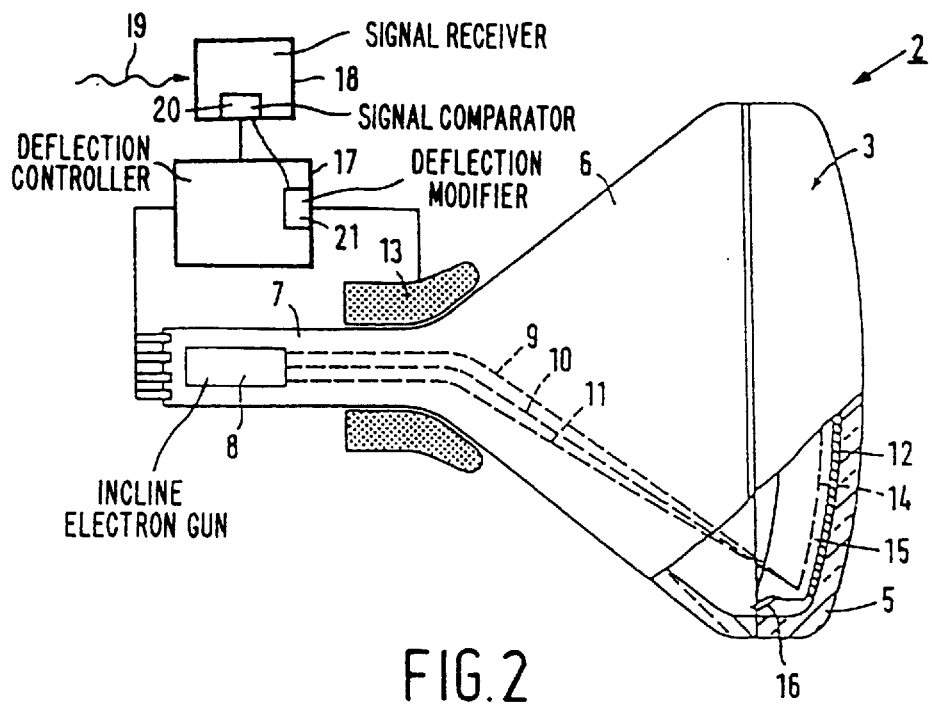
FIG. 2 shows a display system comprising a cathode ray tube.

FIG. 2 shows a display system 1 comprising a color cathode ray tube 3 having an evacuated envelope 4 which, in this example, is composed of a display window 5, a cone portion 6 and a neck 7. Said neck accommodates an in-line electron gun 8 for generating three electron beams 9, 10 and 11, which extend in one plane, the in-line plane, which in this case is the plane of the drawing. On the inside of the display window 5, there is a display screen 12. Said display screen 12 has a large number of pixels luminescing in red, green and blue. On their way to the display screen, the electron beams are deflected across the display screen 12 by means of an electromagnetic deflection unit 13, and pass through a color selection electrode 14 (such a color selection electrode is sometimes referred to as shadow mask) which is arranged in front of the display window 5 and which comprises a thin plate with apertures 15. The color selection electrode is suspended in the display window 5 by means of suspension elements 16. The electron beams 9, 10 and 11 pass through the apertures 15 of the color selection electrode at a small angle with respect to each other and, consequently, each electron beam impinges on phosphor elements of only one color. The display system further comprises means 17 for controlling the deflection, means 18 for receiving a signal 19 and means for influencing the intensity of the electron beams in dependence on the signal received, and comparison means 20 for comparing the distance between the field lines and/or the distance between the pixels with data about the construction of the shadow mask, and modification means 21 which change the deflection, more particularly the scanning-line pitch s and/or the pixel-pitch p, in dependence upon a signal from the comparison means 20.

Figure 3A:
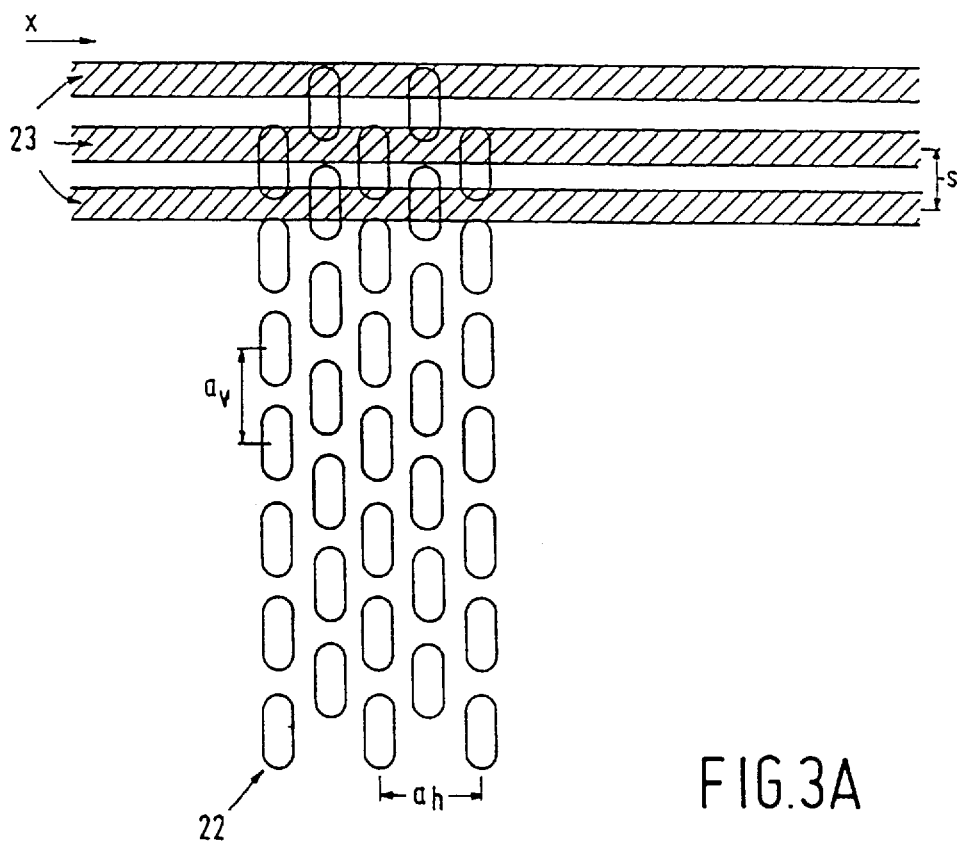
FIGS. 3A, 3B and 3C show three examples of shadow masks.
Figure 3B:
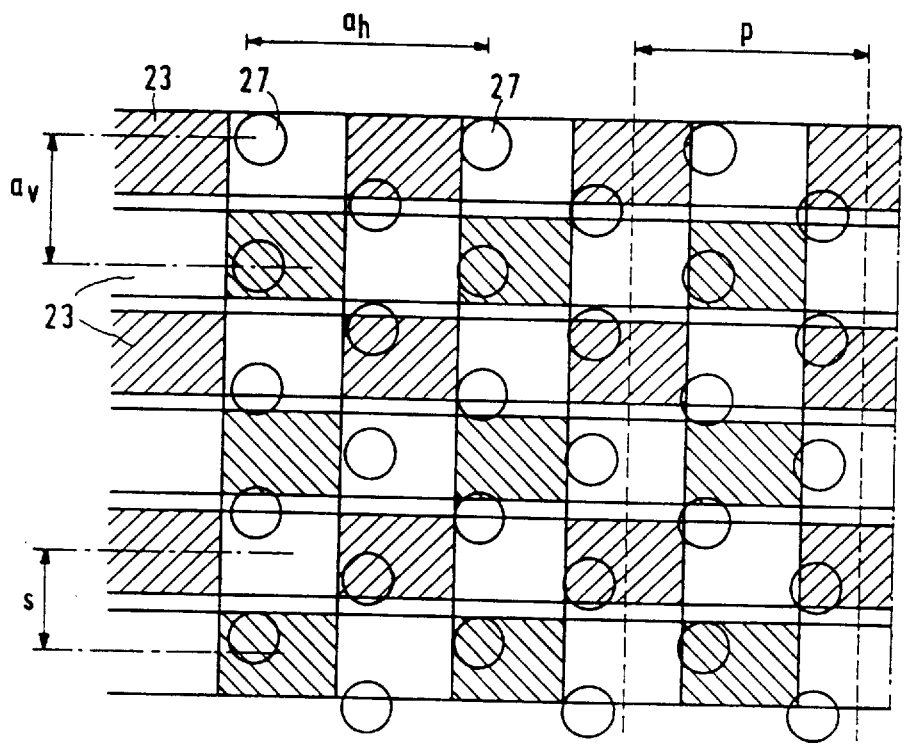

There were in the present application the term "distance" is used (in the claims as well as in the description) it is to be understood to mean the pitch, i.e. the distance between the centres of the apertures or lines as shown in FIGS. 3A and 3B.

Figure 3C:
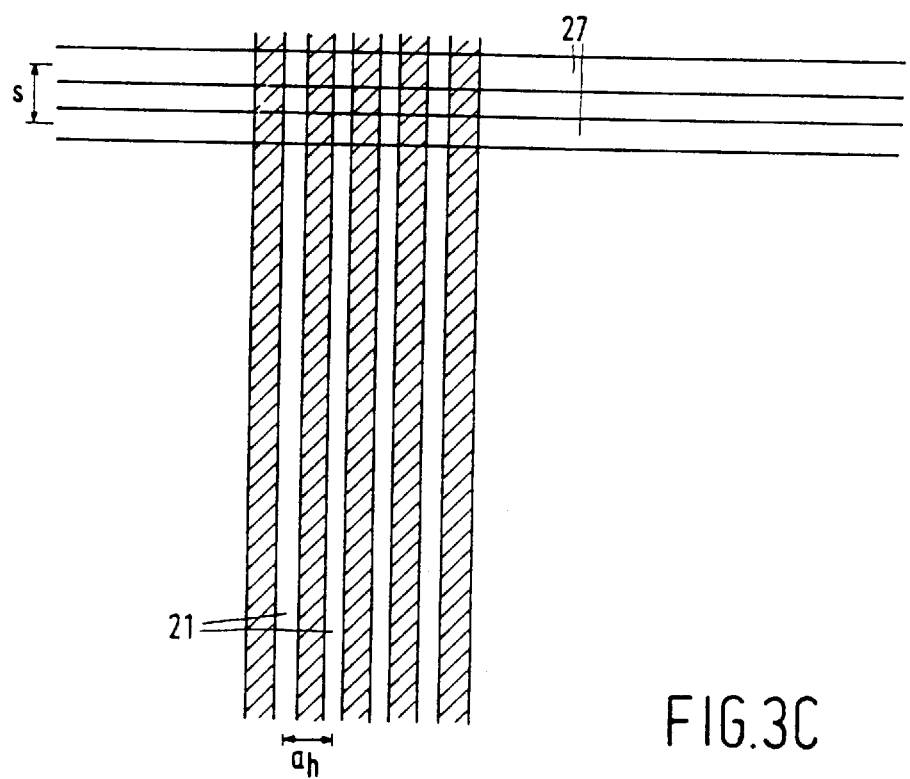

FIGS. 3A, 3B and 3C show three examples of shadow masks. FIG. 3A shows a so-called "slot-shaped" shadow mask. FIG. 3B shows a shadow mask of the so-called "Delta" (hexagonal) type, and FIG. 3C shows a shadow mask of the grating type. For each one of the shadow masks, the distance ($a_v$) between apertures 22 in a column and the distance ($a_h$) between columns is indicated. The distance $a_v$ can also be described as the aperture-pitch in a column and $a_v$ as the column pitch, the pitch being the distance by which an aperture or column has to be translated in a vertical ($a_v$) or horizontal ($a_h$) direction to coincide with the nearest aperture or next nearest column. Further, a number of field lines 23 having an interspace s between the field lines is schematically shown, and FIG. 3B shows a number of pixels 23 having an interspace p between said pixels.

The Table below lists the ratios between $s/a_v$ and $p/a_h$ for a number of signals, for a shadow mask of the type shown in FIG. 3B, in which $a_v$=0.26 mm for 21" CMT mm and $a_h$=0.45 mm for 15" and 17" and 0.26 mm, 0.45 mm for 21", the diagonal across the displayed image being 15", 17" and 21" at an aspect ratio of 4:3,. In this Table, $N_x$ denotes the number of scanning lines and $N_y$ represents the number of pixels per line.

| $N_x$ | $N_y$ | $s/a_v$ (21") | $s/a_v$ (17") | $s/a_v$ (15") | $p/a_h$ (21") | $p/a_h$ (17") | $p/a_h$ (15") |
|---|---|---|---|---|---|---|---|
| 480 (VGA) a | 640 | 18.3/8 | 14.3/8 | 11.9/8 | 10.6/8 | 8.3/8 | 6.9/8 |
| 537 (PAL) b | — | 17.7/8 | 13.8/8 | 11.5/8 | — | — | — |
| 600 (SVGA) a | 800 | 14.7/8 | 11.5/8 | 9.5/8 | 8.5/8 | 6.6/8 | 5.5/8 |
| 768 (XGA) a | 1024 | 11.4/8 | 8.9/8 | 7.5/8 | 6.6/8 | 5.2/8 | 4.4/8 |
| 1024 a | 1280 | 8.6/8 | 6.7/8 | 5.6/8 | 5.0/8 | 3.9/8 | 3.2/8 |
| 1200 a | 1600 | 7.3/8 | 5.7/8 | 4.8/8 | 4.2/8 | 3.3/8 | 2.8/8 | a: 7.7% underscan
b: 7% overscan

The intensity of the Moiré effects is governed by the values of $s/a_v$ and $p/a_h$, and corresponds approximately to the following classification:

for progressive scan:

| $s/a_v$ or $p/a_h$ = | 418: | very strong Moiré effects |
|---|---|---|
| | 2/8 or 8/8: | strong Moiré effects |
| | 16/8: | clearly noticeable Moiré effects |
| | 12/8: | noticeable Moiré effects |
| | 6/8: | hardly noticeable Moiré effect |
| | 10/8: | negligibly small Moiré effects |
| | 14/8: | no noticeable Moiré effects. |

"Progressive scan" means that all lines of an image are scanned successively. Such a scanning method is usually employed for a computer-generated signal. Television images are often built up by first scanning the even field lines and then the odd field lines. Such a scanning method is also referred as "interlace scanning". The Moiré effects for interlace scanning are comparable to the Moiré effects for progressive scanning, except that in the case of $s/a_v$, noticeable Moiré effects occur at ratios of, in particular, 6/8 and, to a lesser degree, of 10/8.

In the case of $s/a_v$ values which deviate from the above values, the Moiré effects are governed by the difference between the actual value and the above-mentioned values, and by the intensity of the Moiré effects at the above-mentioned values.

Minimal Moiré effects, i.e. Moiré effects which are not disturbing, occur for progressive scanning in the following ranges:
2.8/8–3.2/8
5.4/8–5.8/8
6.3/8–7/8
9/8–11.5/8
12.5/8–15/8
17/8–20/8.

The above Table 1 contains a number of values of $s/a_v$ and $p/a_h$ for which very disturbing Moiré effects will occur; these values are shown in bold type. Said Table also contains a number of values for which noticeable Moiré effects can occur; these values are underlined. It is clear that Moiré effects ranging from noticeable to very disturbing occur, in particular, for high-resolution images, i.e. images with a large number of displayed lines.

The following Table shows which change in distance between the scanning lines or between the pixels suffices to bring about a substantial reduction of the Moiré effects.

| $N_x$ | $N_y$ | $s/a_v$ (21") | $s/a_v$ (17") | $s/a_v$ (15") | $p/a_h$ (21") | $p/a_h$ (17") | $p/a_h$ (15") |
|---|---|---|---|---|---|---|---|
| 480 (VGA) | 640 | 0% | 0% | +5% or −4% | 0% | +4% | 0% |
| 537 (PAL) | — | 0% | 0% | −4% | — | — | — |
| 600 (SVGA) | 800 | 0% | 0% | 0% | +5% | 0% | 0% |
| 768 (XGA) | 1024 | 0% | 4% | −6% | 0% | +5% | +7% |
| 1024 | 1280 | +5% | 0% | 0% | +8% | −10% | −3% |
| 1200 | 1600 | −5% | 0% | 8% | 8% | −5% | +3% |

The values listed in the Table above give an indication of the changes which yield a clearly noticeable effect. This does not mean that smaller changes do not have a positive effect. In general, the changes are relatively small, of the order of magnitude of 5%. The most disturbing Moiré effects occur for high-resolution images having $s/a_a$ and/or $p/a_h$ values close to 4/8. These high-resolution images require the largest changes in the line and/or pixel spacing.

To preclude and/or reduce such Moiré effects, a cathode ray tube in accordance with the third aspect of the invention is characterized in that the distance between apertures in the horizontal direction $a_h$ is less than 0.4 mm.

As a result, the $p/a_h$ ratio for high-resolution images is increased (for a 21" cathode ray tube from 4.2/8 to 5.1/8 or more). At first sight, it seems to be contradictory to choose a relatively small distance of $a_h$ for the relatively large cathode ray tubes. However, in this manner it is precluded that the $p/a_h$ value comes close to 4/8. This value of $p/a_h$ causes strong Moiré effects which are relatively difficult (i.e. great changes in the value of p are necessary) to preclude.

As is shown in the Table, either the scanning-line distance or the pixel distance is changed in the example. If said change is relatively great, this can lead to deformation of the geometry of the image. If, for example, the pixel distance p is changed, it is not always possible or desirable to change the scanning-line distance s to an equal extent because of the difference in value between $s/a_v$ and $p/a_h$. For example, in Table 1 the value of $s/a_v$ is 7.3/8 and the value of $p/a_h$ is 4.2/8 for an 21" tube in the last example ($N_x$=1200; $N_y$=1600). A change of p by 10% will lead to an increase of $p/a_h$ to 4.62/8, which is an improvement; if s is increased by 10%, the value of $s/a_v$ becomes 8.03/8, which is clearly a deterioration.

A fourth aspect of the invention relates to a cathode ray tube in which the ratio $a_v/a_h$ ranges between 0.9 and 1.1. As, at said ratio, the values of $s/a_v$ and $p/a_h$ are approximately equal, it is possible, if necessary, to change s and p both in the same direction, thereby reducing the deformation of the geometry of the image. Alternative, preferred ranges of the ratio $a_v/a_h$ are 1.8 to 2.2 and 0.45 to 0.55 ($1.8 \leq a_v/a_h \leq 2.2$ etc.). In this case, the ratios of $s/a_v$ and $p/a_h$ are approximately 2 or 0.5, which also enables s and p to be changed in the same direction, if necessary. The ratio $a_h/a_v$ is usually equal to 1.73 for a shadow mask in which the apertures are arranged in a hexagonal frame, and, in the case of a so-called "slit-mask", the ratio is equal to approximately 1.65.

It will be obvious that many variations are possible to those skilled in the art. For example, the comparison means 20 can derive the scanning-line distance (s) from the incoming signal by measuring the number of lines to be written, determining the overscan or underscan (which yields the number of lines which is deflected across the shadow mask) and dividing this number by the height of the shadow mask.

In second order approximation the scanning-line distance s can also be slightly influenced by other parameters such as the temperature of the tube and aging of the tube. Depending on the required accuracy of the determination of the scanning-line distance such parameters may also be incorporated in the determination of the scanning-line pitch. For instance if it is known that the scanning-line pitch s is dependent on the temperature of the tube and how it is dependent (this can be e.g. established by measuring such dependence in the factory) this knowledge can be used to fine-tune the determination of s. The temperature can be measured or it can deduced from for instance the power dissipated in and around the tube. The value of s thus found is then supplied to a microprocessor which divides this value by the known value of $a_v$, and which compares the ratio $s/a_v$ to a Table from which the desired change of the deflection for various values of $s/a_v$ can be derived. This is a complicated operation. In a simpler operation, the display system comprises a microprocessor which detects which standard signal (VGA, SVGA, PAL etc.) is received and which is provided with a Table in which the action to be undertaken for the various systems is defined. In this embodiment, the distance between the field lines s is not measured, but derived from the type of signal. The above also applies, of course, to the determination, or non-determination, of the distance between the pixels p. The comparison means may even have an input enabling the incoming signal to be identified by hand, for example a switch which can be set in various positions corresponding to the various types of signals.

In the example, the display system comprises means for comparing data of an incoming signal to data of the shadow mask, which may, or may not, lead to an adaption of the deflection.

A computer 2 emits a signal, some computers may even emit signals of more than one type (for example low-middle- and high-resolution signals), each signal corresponding to a specific number of lines in the image displayed and to a specific number of pixels per line displayed. As the above Tables show, one and the same signal may generate very different Moiré effects in different computer monitors. In a second aspect of the invention, the computer comprises comparison means, in which data of the signal sent to a monitor are compared to data about the construction of a shadow mask (i.e. in particular the values of $a_v$ and $a_h$), which may, or may not, lead to adaptation of the signal to be emitted. For example, the number of lines or pixels per line may be increased or reduced by several percent (4 to 6%). If the value of $a_h$ across the shadow mask exhibits a variation, the pixel pitch p can be varied so that the ratio $p/a_h$ exhibits a smaller variation. In this manner, Moiré effects can be reduced. For example, a satisfactory ratio $p/a_h$ in the center of the shadow mask is 5.4/8. However, if the distance between the columns $a_h$ increases by 15% towards the edges of the shadow mask, then the $p/a_h$ ratio at the edges of the shadow mask is 4.7/8, which leads to clearly noticeable Moiré effects. By varying the pixel pitch across the shadow mask, in this example by 10 to 15%, so that the $p/a_h$ ratio remains above 5/8, disturbing Moiré effects can be precluded. It is noted that the above-mentioned idea of varying the pixel pitch p across the shadow mask, leading to a smaller variation of the ratio $p/a_h$, can also be used in a display system without comparison means.

Figure 4:
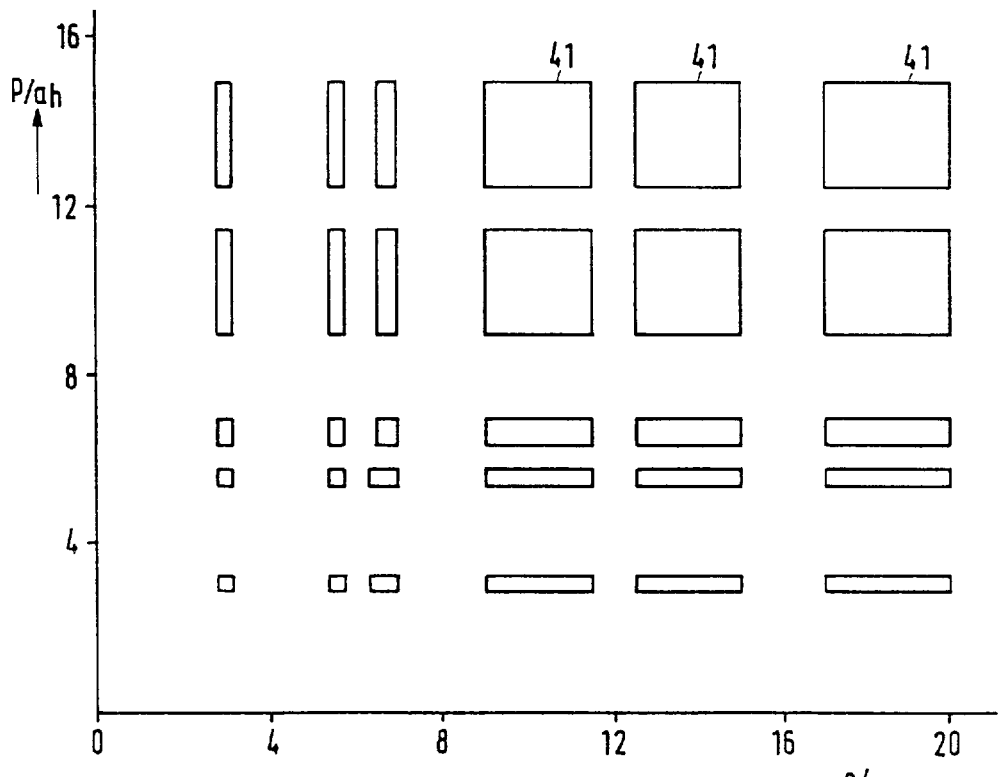
FIG. 4 graphically shows preferred $s/a_v$ and $p/a_h$ ranges.

FIG. 4 graphically shows the preferred values of $s/a_v$ and $p/a_h$. The values within the squares 41 are preferred.

I claim:

1. A display system comprising a cathode ray tube which is provided with a shadow mask having a large number of apertures, which apertures are arranged in columns, a means for generating electron beams and a means for deflecting said electron beams across; the shadow mask, and a means for controlling the deflection of the electron beams across the shadow mask in dependence upon incoming signals, characterized in that the display system comprises comparison means to compare the distance s between scanning lines of the incoming signals with a distance $a_v$ between apertures in a column, and modification means to change, in dependence upon the ratio $s/a_v$ the deflection of the electron beams.

2. A display system comprising a cathode ray tube which is provided with a shadow mask having a large number of apertures, which apertures are arranged in columns, a means for generating electron beams and a means for deflecting said electron beams across the shadow mask, and a means for controlling the deflection of the electron beams across the shadow mask in dependence upon incoming signals, characterized in that the display system includes comparison means for comparing the p distance between pixels of the incoming signals to the distance $a_h$ between columns of apertures, and modification means for changing the deflection of the electron beams in dependence upon the ratio $p/a_h$.

3. A display system as claimed in claim 1, characterized in that the display system comprises comparison means for comparing the distance p between pixels of the incoming signals to the distance $a_h$ between columns of apertures, and modification means for changing the deflection of the electron beams in dependence upon the ratio $p/a_h$.

4. A display system as claimed in claim 3, characterized in that the means for changing the signal includes means for changing the signal to result in a value for $s/a_v$ in one of the following ranges:
2.8/8–3.2/8
5.4/8–5.8/8
6.3/8–7/8
9/8–11.5/8
12.5/8–15/8
17/8–20/8.

5. A display system as claimed in claim 3, characterized in that the means for changing the signal includes means for changing the signal to result in a value for $p/a_h$ in one of the following ranges:
2.8/8–3.2/8
5.4/8–5.8/8
6.3/8–7/8
9/8–11.5/8
12.5/8–15/8
17/8–20/8.

6. A display system comprising a cathode ray tube having a shadow mask of the grating type which is provided with a large number of apertures, and comprising a means for generating electron beams and a means for deflecting the electrons beams across the shadow mask, and a means for controlling the deflection of the electron beams across the shadow mask in dependence upon incoming signals, characterized in that the display system includes comparison means for comparing the distance p between pixels of the incoming signals to the distance $a_h$ between gratings, and modification means for changing the deflection of the electron beams in dependence upon the ratio $p/a_h$.

7. A display system as claimed in claim 1, characterized in that, after the changes, the values for $s/a_v$ are in one of the following ranges:
2.8/8–3.2/8
5.4/8–5.8/8
6.3/8–7/8
9/8–11.5/8
12.5/8–15/8
17/8–20/8.

8. A display system as claimed in claim 2, characterized in that, after the changes, the values for $p/a_h$ are in one of the following ranges:
2.8/8–3.2/8
5.4/8–5.8/8
6.3/8–7/8
9/8–11.5/8
12.5/8–15/8
17/8–20/8.

9. A display system as claimed in claim 6, characterized in that the means for changing the signal includes means for changing the signal which results in a value for $p/a_h$ in one of the following ranges:
2.8/8–3.2/8
5.4/8–5.8/8
6.3/8–7/8
9/8–11.5/8
12.5/8–15/8
17/8–20/8.

10. A computer comprising terminals for connecting a cathode ray tube, and comprising means for generating a signal for driving the cathode ray tube, which signal determines at least one of the distance s between lines and the distance p between pixels displayed on the cathode ray tube, characterized in that the computer comprises comparison means for comparing the signal to at least one of the known values of the vertical distance $a_v$ and the horizontal distance $a_h$ between apertures, and modification means for changing the signal in dependence upon a comparison between at least one of the values $a_v$ and $a_h$ and the signal.

* * * * *